US009869056B2

(12) United States Patent
Fukuda et al.

(10) Patent No.: US 9,869,056 B2
(45) Date of Patent: Jan. 16, 2018

(54) ROPE END-FASTENING METHOD, ROPE WITH END FASTENER, AND END FITTING FOR USE IN ROPE END-FASTENING METHOD

(71) Applicants: Toko Bridge Co., Ltd., Tochigi (JP); Tokyo Rope Mfg. Co., Ltd., Tokyo (JP)

(72) Inventors: Yasuyuki Fukuda, Tochigi (JP); Noriaki Kose, Tokyo (JP)

(73) Assignees: TOKYO ROPE MFG. CO., LTD., Tokyo (JP); TOKO BRIDGE CO., LTD., Tochigi (JP)

( * ) Notice: Subject to any disclaimer, the term of this patent is extended or adjusted under 35 U.S.C. 154(b) by 33 days.

(21) Appl. No.: 15/039,541

(22) PCT Filed: Dec. 2, 2013

(86) PCT No.: PCT/JP2013/082359
§ 371 (c)(1),
(2) Date: May 26, 2016

(87) PCT Pub. No.: WO2015/083214
PCT Pub. Date: Jun. 11, 2015

(65) Prior Publication Data
US 2017/0022661 A1    Jan. 26, 2017

(51) Int. Cl.
*F16G 11/05* (2006.01)
*D07B 9/00* (2006.01)
*F16G 11/02* (2006.01)

(52) U.S. Cl.
CPC .............. *D07B 9/00* (2013.01); *F16G 11/02* (2013.01); *F16G 11/05* (2013.01)

(58) Field of Classification Search
CPC .......... F16G 11/00; F16G 11/02; F16G 11/04; F16G 11/05; Y10T 403/4908
See application file for complete search history.

(56) References Cited

U.S. PATENT DOCUMENTS 2,959,436 A * 11/1960 Duda ................... F16G 11/02
174/90
3,267,539 A * 8/1966 Mark .................... F16G 11/048
403/275
(Continued)

FOREIGN PATENT DOCUMENTS

JP    H04-33693 U    3/1992
JP    2004-277922 A   10/2004
(Continued)

OTHER PUBLICATIONS

International Search Report dated Mar. 4, 2014 for Application No. PCT/JP2013/082359, 5 pgs.

*Primary Examiner* — Daniel J Wiley
(74) *Attorney, Agent, or Firm* — Frost Brown Todd LLC

(57) ABSTRACT

A rope terminal fixing method is provided, which may be used easily at a construction site, causes less shearing load, and may reliably prevent the falling-off of the rope.
The rope terminal fixing method comprises the following steps. A tubular terminal metal fitting which comprises a proximal opening, a distal opening, and a through hole communicating the proximal and distal openings is prepared. A terminal of a rope is inserted through the proximal opening into the through hole, a portion of the terminal of the rope extended from the distal opening is loosened, and a diameter-enlarging member is fixed to a core wire of the rope. Then, the terminal of the rope is brought back into the through hole. A fixed width portion extending in an axial direction of the terminal metal fitting is pressed from the outside in a circumferential direction by swaging, such that a protrusion constraining the rope so as to reduce its diameter is formed in the through hole. The diameter-enlarging member cooperates with an end of the protrusion located on the distal opening side to constrain surrounding wires other than the core wire in a sandwiching manner. A rope with (Continued)

terminal fixing tools, which comprises the terminal fixing tools attached thereto by this method, is also provided.

7 Claims, 4 Drawing Sheets

(56) References Cited

U.S. PATENT DOCUMENTS

| | | | | |
|---|---|---|---|---|
| 3,475,795 | A * | 11/1969 | Youngblood | F16G 11/05 174/135 |
| 3,600,765 | A * | 8/1971 | Rovinsky | F16G 11/048 24/122.6 |
| 4,021,130 | A * | 5/1977 | Crook, Jr. | F16G 11/048 403/275 |
| 4,055,365 | A * | 10/1977 | Kucherry | F16G 11/14 24/115 R |
| 4,279,531 | A * | 7/1981 | McKenzie | F16G 11/05 403/267 |
| 4,507,008 | A * | 3/1985 | Adl | F16G 11/05 174/89 |
| 5,022,780 | A * | 6/1991 | Shaw | F16G 11/05 24/122.3 |
| 5,136,755 | A * | 8/1992 | Shaw | F16G 11/05 24/122.6 |
| 5,231,752 | A * | 8/1993 | Hereford | F16G 11/05 24/122.6 |
| 5,415,490 | A * | 5/1995 | Flory | F16G 11/05 24/122.6 |
| 5,735,628 | A * | 4/1998 | Short | F16G 11/05 403/218 |
| 7,984,542 | B1 * | 7/2011 | Tillitski | F16G 11/05 29/525.02 |
| 2004/0040123 | A1 * | 3/2004 | Tillitski | F16G 11/06 24/136 L |

FOREIGN PATENT DOCUMENTS

| | | |
|---|---|---|
| JP | 4288122 B2 | 7/2009 |
| JP | 2010-070882 A | 4/2010 |
| JP | 2010-095842 A | 4/2010 |
| WO | WO 2015/083214 A1 | 6/2015 |

* cited by examiner

ROPE END-FASTENING METHOD, ROPE WITH END FASTENER, AND END FITTING FOR USE IN ROPE END-FASTENING METHOD

TECHNICAL FIELD

The present invention relates to a rope terminal fixing method and a rope with terminal fixing tools. In particular, the present invention relates to a rope terminal fixing method which may be implemented easily even at a construction site; a rope with terminal fixing tools, which comprises the terminal fixing tools attached thereto by this method; and a terminal metal fitting used in the rope terminal fixing method.

BACKGROUND ART

Generally, ropes are widely used in, for example, the mooring of ships, or car coupling. In particular, since a strand wire rope as a high-strength fiber composite cable such as a carbon fiber composite cable has characteristics such as high strength, light weight, high corrosion resistance, and a non-magnetic property, it has been used as, for example, a reinforcing material for a concrete structure such as a pier or a prestressed concrete bridge in a corrosive environment; a tensile material for a high corrosion resistant ground anchor; a reinforcing core material for an overhead transmission line with less deflection; and a reinforcing material for a non-magnetic concrete structure (e.g., a guideway for a magnetic levitation train).

In order to use these ropes for the above-described purposes, a terminal of a rope must be processed using a terminal fixing tool such that the terminal is suitable for coupling.

However, some ropes may sometimes fall off the terminal fixing tool when a tensile load is applied to the ropes, because the fastening power by the terminal fixing tool is weakened due to the diameter reduction of the ropes. Further, as for the high-strength fiber composite cable, while it has high strength comparative to a PC steel strand wire when tensioned in an axial direction, it is vulnerable to a surface flaw, the local shearing force in a diametrical direction, and so on. Thus, in attaching the terminal fixing tool to the rope, a fixing method by directly inserting a wedge, which may be employed as a normal method for fixing a PC steel strand wire, easily causes cutting of the rope due to the shear failure, and as a result, high fixing efficiency cannot be achieved.

As measures to address the above problems, rope terminal fixing methods have been proposed in, for example, a publication of a patent application filed by the applicants (Patent Document 1) and a patent owned by the applicant (Patent Document 2). These fixing methods are suitable for use at a construction site.

In the fixing method of Patent Document 1, after a terminal of a rope is inserted into a tubular hole of a tubular metal fitting, at least one large-diameter chevron portion formed on the tubular metal fitting is reversely protruded on the tubular hole side by swaging, such that the rope is fixed while increasing the area of contact between the tubular metal fitting and the rope. In the fixing method of Patent Document 2, an expansion material filling socket is used to avoid the local concentration of stress in processing of a terminal of a high-strength fiber composite cable. Specifically, a partition member comprising a cable insertion hole and filler passage holes around the cable insertion hole is fit over the terminal of the cable, the cable is then inserted into a sleeve such that the partition member is located in the longitudinal center of the sleeve, and subsequently, water stop tools are attached to both ends of the sleeve. Then, the expansive filler such as cement is injected through the filler passage holes of the partition member to fill up the entire sleeve. After that, the expansive filler is cured, such that the cable terminal is fixed by friction due to expansion pressure of the expansive filler.

PRIOR ART DOCUMENTS

Patent Documents

Patent Document 1: Japanese Patent Application Publication 2010-70882
Patent Document 2: Japan Patent No. 4288122

SUMMARY OF THE INVENTION

Problems to be Solved by the Invention

However, in the fixing method of Patent Document 1, when a rope having high elasticity and a large cross-sectional area change rate under tension, such as a rubber cord, is used and an excessive tensile load is applied, there may be a risk that the rope falls off the terminal fixing tool. In this regard, there is room for improvement.

In the fixing method of Patent Document 2, since the expansive filler such as cement is used, a decision must be made on whether the filler has been certainly filled in the sleeve, and it takes time (at least a few hours) for the filler to cure and exhibit strength after its filling. Based on these aspects, since an amount, temperature, and curing of the filler must be controlled exactly from the filling of the expansive filler through the filler curing and the exhibition of strength, a high level of skill is required in construction, and the processing of the rope terminal may not necessarily be easy. Therefore, in this regard, there is also room for improvement.

The present invention was made in view of the above-described problems. It is an object of the present invention to provide a rope terminal fixing method, which may achieve high fixing efficiency and fixing effect with simple operation even at a construction site regardless of the material of the rope, which may exhibit the fixing effect promptly, and which hardly causes the cutting due to the shear failure.

It is another object of the present invention to provide a rope with terminal fixing tools, which comprises the terminal fixing tools attached to the rope by this fixing method.

Means for Solving the Problems

In order to achieve the above objects, one aspect of the present invention provides a rope terminal fixing method, which comprises the steps of: preparing a tubular terminal metal fitting having a proximal opening formed at its proximal end, a distal opening formed at its distal end, and a through hole communicating the proximal opening and the distal opening; inserting a terminal of a rope through the proximal opening into the through hole to extend a portion of the terminal of the rope from the distal opening; enlarging a diameter of the terminal of the rope; bringing the terminal of the rope back into the through hole; and pressing the terminal metal fitting from the outside in a circumferential direction to make a diameter of the through hole smaller than the maximum diameter of the diameter-enlarged terminal of the rope and form a protrusion on an inner surface of the through hole, the protrusion pushing against an outer peripheral surface of the rope to constrain the rope within the through hole.

In the step of enlarging a diameter of the terminal of the rope, the terminal of the rope is loosened to fix a diameter-enlarging member to a strand or wire constituting the rope.

The diameter enlargement of the terminal of the rope may be achieved by a method in which, for example, wedge-like diameter-enlarging members each having a through hole for the wire and a tapered surface on its outer periphery are attached to outer peripheries of a plurality of wires or strands constituting the rope. As another method, it may be contemplated that a ring-shaped member is attached to an outer periphery of the terminal of the rope. The methods for enlarging the diameter of the terminal of the rope are not limited to the above methods.

The method of pressing the terminal metal fitting from the outside in the circumferential direction is preferably, but not limited to, swaging, for example. Most desirably, the pressing is performed such that constant pressure is applied across the whole circumference of the fixing metal fitting so as to put an equal load on the rope. However, it shall not exclude unbalanced pressure, or pressure only applied to a portion of the terminal metal fitting.

It is desirable that a portion substantially corresponding to a decrease in an outer diameter of the terminal metal fitting due to the pressing reversely protrudes into the through hole as the protrusion. In this case, the terminal metal fitting has a reference diameter portion located at the distal end side, and a large-diameter portion located at the proximal end side and continuous with the reference diameter portion. The large-diameter portion is a fixed width portion in an axial direction of the terminal metal fitting, and the protrusion may be formed by pressing the terminal metal fitting from the outside in the circumferential direction so as to reversely protrude the large-diameter portion into the through hole.

It is preferable that the terminal metal fitting is pressed from the outside in the circumferential direction until the large-diameter portion has substantially the same diameter as the reference diameter portion, thereby enabling formation of the protrusion by which sufficient constraining force may be achieved without breaking the surrounding wires or strands constituting the rope.

A tapered surface is preferably formed on the distal opening side in the through hole between an inner surface having a small diameter due to the formation of the protrusion and an inner surface at the end on the distal opening side where the diameter is large due to a lack of the protrusion. In this case, by forming the end of the large-diameter portion to be a tapered inclined surface, an end of the protrusion made by reversely protruding the tapered inclined surface may have a tapered surface. Further, if a wedge-like diameter-enlarging member having a tapered surface on its outer periphery is attached in order to increase the diameter of the terminal of the rope, the diameter-enlarging member preferably has, on the side facing to the end of the protrusion, a complementary tapered surface corresponding to the tapered surface. In this manner, a large contact area or friction force may be ensured in relation to wires of the rope sandwiched between both tapered surfaces.

In the fixing method of the present invention, the rope may be formed by twisting a plurality of lateral strands (surrounding strands) together around a central strand (core strand).

The rope may be a high-strength fiber composite cable comprising a carbon fiber composite cable formed by twisting a plurality of surrounding wires together around a core wire.

The rope with terminal fixing tools may comprise the terminal fixing tools attached thereto by the above terminal fixing method.

The terminal metal fitting of the present invention is a tubular terminal metal fitting used for fixing the terminal of the rope, which comprises a reference diameter portion that has a through hole and is located on the distal end side, and a large-diameter portion that has a through hole, is located on the proximal end side, has a thickness greater than the reference diameter portion, and is continuous with the reference diameter portion. When the large-diameter portion is pressed from the outside in the circumferential direction while an end of the rope with its terminal diameter enlarged is positioned inside the reference diameter portion, the diameter of the through hole of the large-diameter portion is smaller than the maximum diameter of the diameter-enlarged terminal of the rope, such that a protrusion pushing against an outer peripheral surface of the rope to constrain the rope within the through hole is formed.

Effect of the Invention

According to the present invention, with the rope inserted in the through hole of the terminal metal fitting, the fixed width portion extending in the axial direction of the terminal metal fitting is pressed from the outside in the circumferential direction, such that a protrusion constraining the rope so as to reduce its diameter is formed within the through hole, thereby constraining the rope with the entire surface (inner peripheral surface) of the protrusion. Therefore, withdrawal of the rope may be surely and easily prevented while preventing the local concentration of stress on the rope.

According to the present invention, when the pressing operation is completed, the diameter-enlarging member coupled to the strand or wire constrains the rope in a manner that an inner surface of the through hole pushes against the strands or wires constituting the rope, and thus, an anchor effect on the rope may be achieved. Therefore, a reliable effect of preventing the falling-off of the rope may be obtained.

Additionally, according to the present invention, since no expansive filler such as cement is used, precise control on an amount, temperature, etc. of the expansive filler is not necessary at a construction site. Therefore, since there is no skill requirement for operators, and there is no need to wait for hardening, etc. of the filler, working hours may be significantly shortened, and operating efficiency may be improved.

The other purposes and advantages of the present invention will be clear from the description below, accompanying drawings, and appended claims.

BEST MODE FOR CARRYING OUT THE INVENTION

Embodiments of the present invention are described below with reference to the drawings.

A rope as used herein includes one which is formed by parallelizing or twisting a plurality of wires together, regardless of materials. The rope as used herein also includes a rope formed by twisting a plurality of wires together into a strand and then twisting a plurality of strands.

The rope as used herein further includes one which is formed by impregnating a single wire, or a plurality of wires twisted together into a single wire, with resin to make a composite and twisting a plurality of wires each made from the composite. A surface of the composite may be wrapped, for example, by being covered with fibers to have a blade shape, covered by resin, or have fibers wrapped therearound before twisting.

Specific examples of the rope include, for example, a rope formed from high-elasticity fibers such as synthetic fibers illustrated as rubber, nylon, and Tetoron®; a high-strength fiber composite cable formed by impregnating a high-strength and low-elasticity fiber such as a carbon fiber, aramid fiber, or silicon carbide fiber with thermo-setting resin such as epoxy resin, unsaturated polyester resin, or polyurethane resin, and twisting a plurality of composites formed in this way as wires; or the like.

The high-strength fiber composite cable is preferably used as, for example, a reinforcing material for a concrete structure such as a pier or a prestressed concrete bridge in a corrosive environment; a tensile material for a high corrosion resistant ground anchor; a reinforcing core material for an overhead transmission line with less deflection; and a reinforcing material for a non-magnetic concrete structure (e.g., a guideway for a magnetic levitation train). The rope terminal fixing method according to the embodiment is described below with respect to a carbon fiber composite cable (CFCC®), one of the high-strength fiber composite cables, as an example.

With reference to FIGS. 1A to 1E, the carbon fiber composite cable 1 of this embodiment is formed by: impregnating carbon fibers with epoxy resin to form composites, winding wrapping fibers around respective surfaces of the composites to provide wires, and twisting the wires together.

Figure 2:
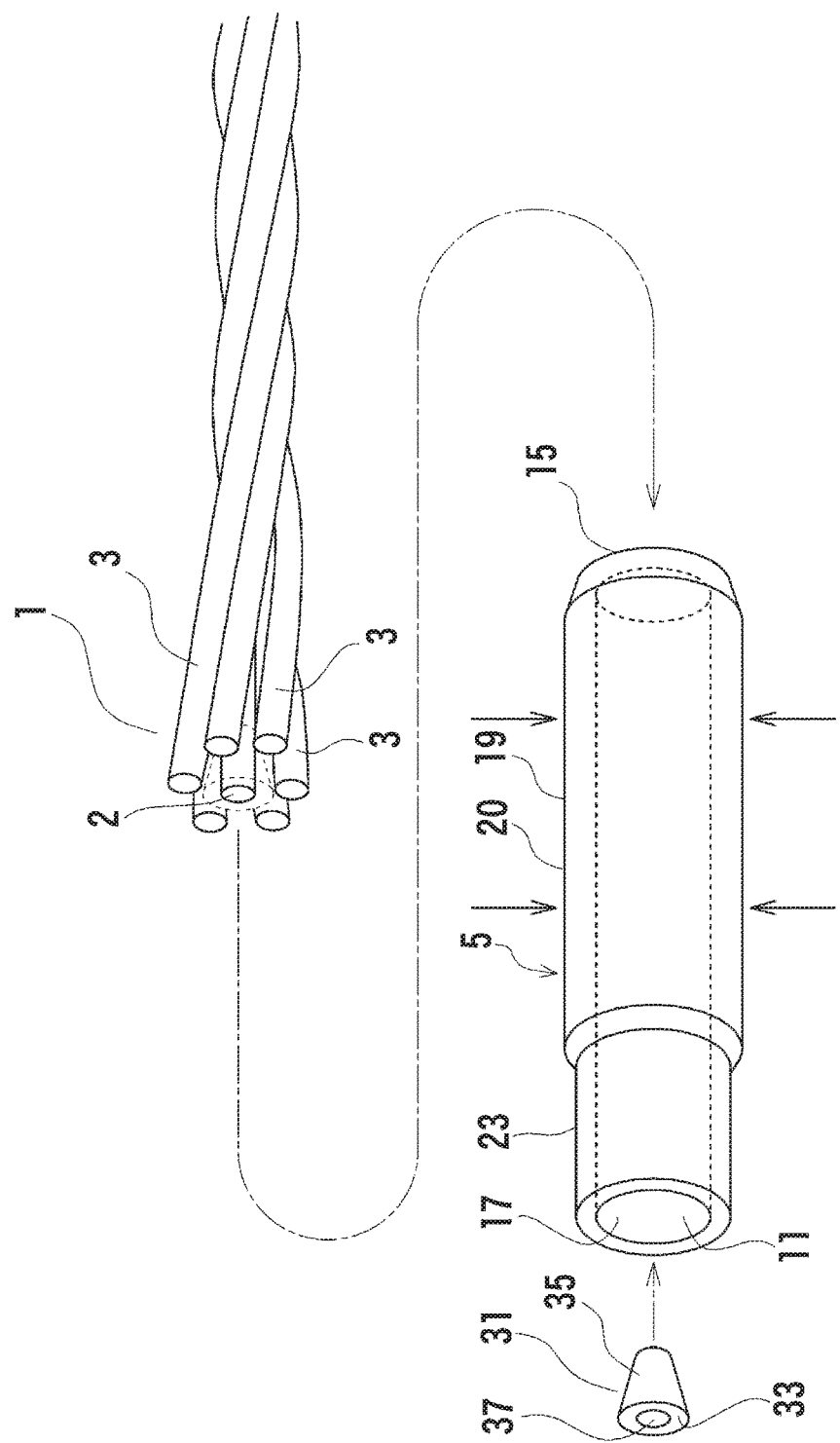
FIG. 2 is similar to FIG. 1, showing an enlarged view of the rope, terminal metal fitting, and diameter-enlarging member before the insertion of the terminal of the rope into the terminal metal fitting.
Figure 3:
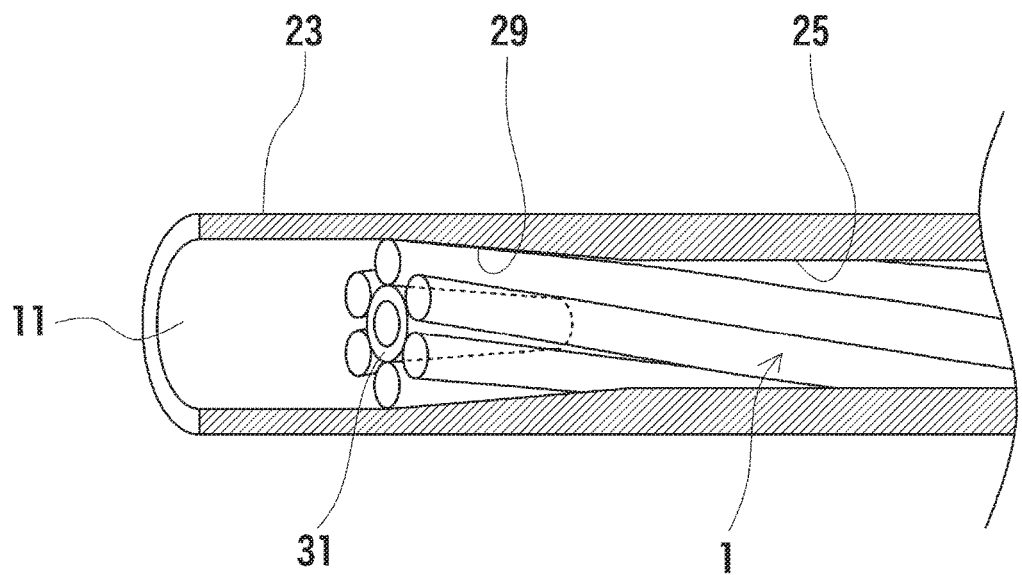
FIG. 3 is an enlarged cross-sectional view of a portion of the distal side of FIG. 1E.
Figure 4:
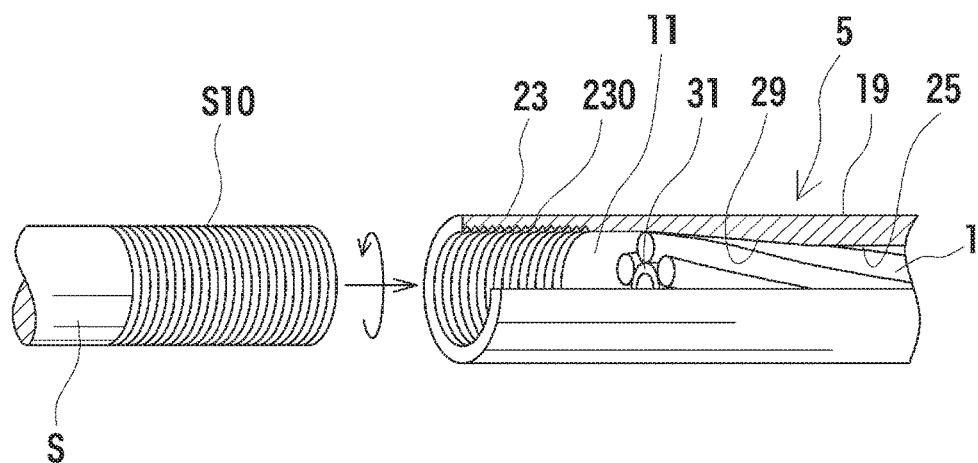
FIG. 4 is a partial cutaway view illustrating a situation before a screw shaft is coupled to the terminal metal fitting.

As is clear from FIG. 2, the carbon fiber composite cable 1 is a seven-strand wire formed by twisting seven pieces of wire together, and comprises a core wire 2 located at its center, and six pieces of surrounding wire 3 wound around the core wire 2. However, the carbon fiber composite 1 may be formed from any preferable number of strand wires other than seven pieces of strand wire, and it may be, for example, a nineteen-strand wire or thirty seven-strand wire. In the case of the nineteen-strand wire, the carbon fiber composite cable generally comprises the core wire, six pieces of first surrounding wire twisted around the core wire, and twelve pieces of second surrounding wire further twisted around the first surrounding wires. The thirty seven-strand wire additionally comprises eighteen pieces of third surrounding wire further twisted around the twelve pieces of second surrounding wire. In the drawings, the terminal metal fitting discussed in more detail below is designated by reference numeral 5, and a wedge-like diameter-enlarging member is designated by reference numeral 31. The terminal metal fitting 5 and diameter-enlarging member 31 form the terminal fixing tool for the carbon fiber composite cable 1.

The terminal metal fitting 5 is tubular as a whole. A proximal opening 15 and a distal opening 17 are formed in a proximal end 7 and a distal end 9, respectively, and a through hole (tubular hole) 11 extending in an axial direction communicates the openings 15 and 17 with each other. In this embodiment, the terminal metal fitting 5 has a reference diameter portion 23 on the side of the distal end 9 of the terminal metal fitting, and a large-diameter portion 19 on the side of the proximal end 7, which is continuous with the reference diameter portion 23. The large-diameter portion 19 is trapezoidal when viewed from the side, and comprises a flat outer peripheral surface 20 and tapered portions 21 that are inclined from both axial ends of the outer peripheral surface in opposing directions to decrease the diameter to connect to the reference diameter portion 23. The through hole 11 has a constant diameter throughout its length.

Accordingly, the large-diameter portion 19 is thicker than the reference diameter portion 23. The diameter of the large-diameter portion 19 is set to have a suitable thickness based on an amount of swaging described below, a diameter of the carbon fiber composite cable used, and so on. This aspect will be discussed below with reference to the results of a tensile test. Also, the relation between the length of the large-diameter portion 19 and the diameter of the carbon fiber composite cable was tested, and this test will also be described below.

The terminal metal fitting 5 is generally formed from a metal such as a steel-based, stainless steel-based, or aluminum-based metal which is plastically deformed by swaging.

In this embodiment, the diameter-enlarging member 31 used for increasing the diameter of the terminal of the rope is substantially a cone, and comprises a bottom surface 33, a truncated conical surface 35 extending from the bottom surface toward a tip, and a through hole 37 extending in an axial direction, such that it has a wedge-like shape. The through hole 37 preferably has a diameter identical to or slightly larger than the diameter of the core wire 2 of the carbon fiber composite cable 1.

While an external form of the diameter-enlarging member 31 is a cone in the illustrated example, it may be a hemisphere, or a column having a rounded tip, as necessary. The diameter-enlarging member 31 may be comprised of halved diameter-enlarging members each having a halved through hole such that, in use, the halved diameter-enlarging members may be coupled. While the diameter-enlarging member 31 is generally formed from a metal such as a steel-based, stainless steel-based, or aluminum-based metal, it may be formed from another material such as hard synthetic resin.

Next, a specific method for fastening the terminal fixing tool to the carbon fiber composite cable according to the embodiment is described.

Figure 1A:
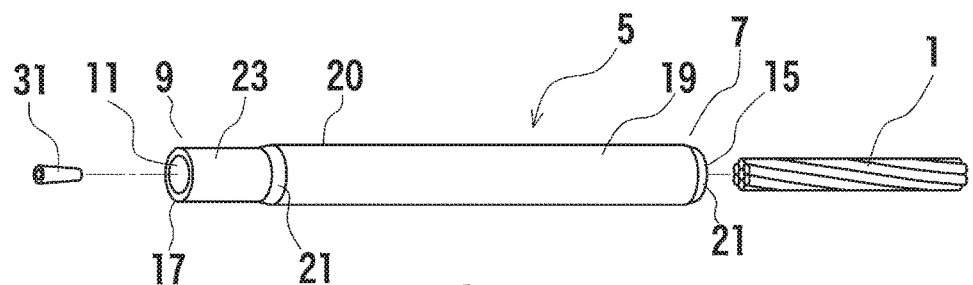
FIG. 1A is a side view illustrating a terminal metal fitting used in a terminal fixing method according to an embodiment of the present invention, and shows a terminal of a rope before insertion into the terminal metal fitting.

In FIG. 1A, a terminal of the carbon fiber composite cable 1 is inserted through the proximal opening 15 of the terminal metal fitting 5 into the through hole 11, and then, a tip of the cable 1 extends out of the distal opening 17. An operator may conduct this process with gloved hands. At this point, since the through hole 11 has the constant diameter throughout its length in an axial direction, the insertion of the cable 1 is facilitated.

Figure 1B:
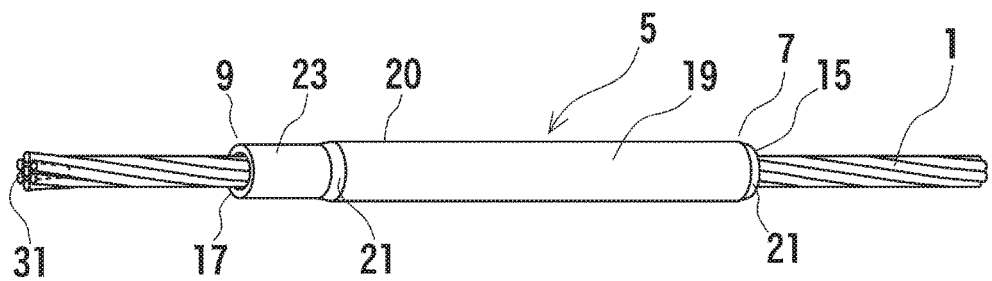
FIG. 1B is a diagram illustrating a situation in which the terminal of the rope is inserted through the terminal metal fitting, a tip of the terminal of the rope is untwisted, and a diameter-enlarging member is secured to a core wire.

Then, in FIG. 1B, the tip of the terminal of the carbon fiber composite cable 1 extended out of the distal opening 17 of the terminal metal fitting 5 is untwisted to expose the core wire 2 surrounded by the surrounding wires 3 (FIG. 2). This process may also be manually conducted. The diameter-enlarging member 31 is driven from the tip side of the conical portion 35 over the core wire 2 via the through hole 37 such that the diameter-enlarging member 31 fits over and is secured on the core wire 2. This process may be carried out using a dedicated jig (not shown). In doing so, an adhesive, etc. may be used as necessary in order to secure the diameter-enlarging member 31.

If the diameter-enlarging member 31 is comprised of the halved diameter-enlarging members, the members may be fit from both sides of the wire 2 to be secured on the wire 2. If the carbon fiber composite cable 1 is comprised of, e.g., a nineteen-strand wire or thirty seven-strand wire in other embodiments, a central wire and first surrounding wires (6 pieces) or second surrounding wires (12 pieces) around the central wire may be selected as a core wire, and the diameter-enlarging member 31 may be secured around these wires.

Figure 1C:
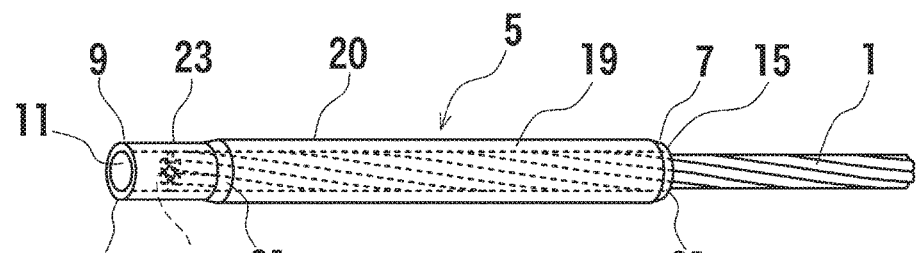
FIG. 1C is a diagram illustrating a situation in which the terminal of the rope with the diameter-enlarging member secured to the core wire is brought back into the terminal metal fitting.

After the diameter-enlarging member 31 is fit over the core wire 2, the terminal of the carbon fiber composite cable 1 is pushed back into the through hole 11 of the terminal metal fitting 5 as shown in FIG. 1C. This process may also be carried out using a dedicated jig (not shown). The diameter-enlarging member 31 is pushed while the 6 pieces of surrounding wire 3 are circumferentially arranged on the conical surface of the conical portion 35. The position to which the diameter-enlarging member 31 is pushed is near a point where a tapered portion 21 of the large-diameter portion 19 of the terminal metal fitting 5 (tapered portion on the distal end 9 side of the terminal metal fitting) connects to the reference diameter portion 23.

Figure 1D:
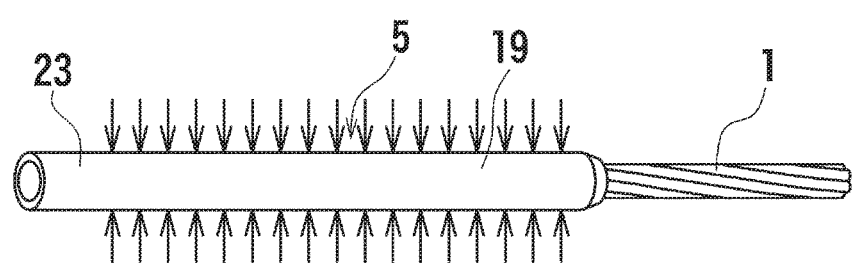
FIG. 1D is a diagram illustrating a situation in which the terminal metal fitting with the terminal of the rope brought back therein is swaged such that the large-diameter portion of the terminal metal fitting is pressed to have the same diameter as the reference diameter portion of the terminal metal fitting.
Figure 1E:
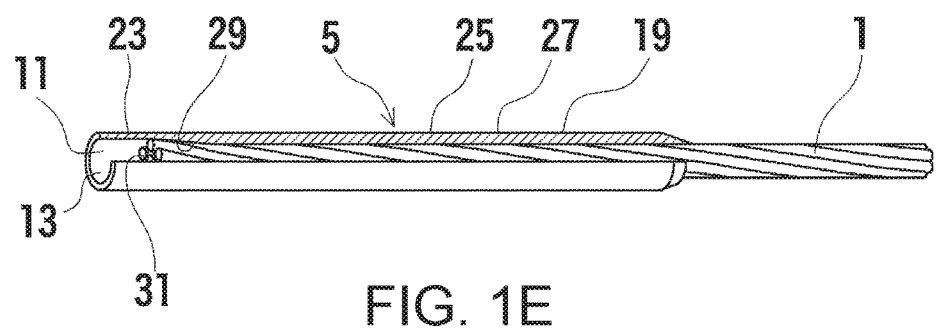
FIG. 1E is a partial cutaway view illustrating a situation in which the large-diameter portion of the terminal metal fitting is reversely protruded into the through hole by swaging so as to form a protrusion, and as a result, the protrusion constrains the terminal of the rope, and the diameter-enlarging member pushes surrounding wires other than a central wire against an end of the protrusion.

Then, as shown in FIGS. 1D and 1E, the terminal metal fitting 5 is swaged, and the large-diameter portion 19 is pressed from the outside in the circumferential direction to be reversely protruded into the through hole 11, thereby forming the protrusion 25 reducing the diameter of the through hole. The protrusion 25 has a shape corresponding to the shape of the original large-diameter portion 19, and comprises a protrusion surface (inner peripheral surface) 27, and protruding tapered portions 29 at both ends of the protrusion in an axial direction which are inclined in opposite directions from the protrusion surface 27 for diameter expansion to connect to the inner peripheral surface 13 (inner peripheral surface defining the through hole 11).

The protrusion 25 also reduces the diameter of the carbon fiber composite cable 1 and constrains it with the protrusion surface 27. This allows the terminal metal fitting 5 to be securely attached to the terminal of the cable 1 without the use of an adhesive, etc.

The amount of pressing (amount of swaging) on the large-diameter portion 19 is conveniently determined such that the pressing (swaging) is performed until the diameter of the large-diameter portion is substantially identical to that of the reference diameter portion 23. Setting the diameter of the large-diameter portion 19 in relation to the diameter of the reference diameter portion 23 allows for easy control of the degree of reverse protrusion of the protrusion 25 into the through hole 11, and thus the degree of the pushing against the cable 1. That is, even if the rope is a high-strength fiber composite cable such as the carbon fiber composite cable formed by twisting a plurality of surrounding wires around a core wire, the protrusion must be formed to the extent that the damage due to the split of fibers, etc. will not occur in a surface against which the protrusion pushes. As a guideline, a visually confirmable criterion is provided, which defines that the most efficient protrusion is formed by providing the reference diameter portion 23 and large-diameter portion 19 and pressing the large-diameter portion 19 until having substantially the same diameter as the reference diameter portion 23. By doing so, the efficient working, by which sufficient constraining force may be achieved without breaking the rope, may be easily performed, the quality may be improved and stabilized, and the operating efficiency may also be improved.

On the other hand, the diameter-enlarging member 31 placed over and secured to the core wire 2 of the carbon fiber composite cable 1 is located adjacent to the protruding tapered portion 29 of the protrusion 25 on the distal opening 17 side within the through hole 11, such that the 6 pieces of surrounding wire 3 other than the core wire are sandwiched between the diameter-enlarging member 31 and the protruding tapered portion 29. With the surrounding wires 3 circumferentially arranged on the conical portion 35 of the diameter-enlarging member 31, the surrounding wires are pushed against the protruding tapered portion 29.

In this way, the diameter-enlarging member 31, together with the protruding tapered portion 29, serves as an anchor for rigidly securing and constraining the cable 1. This further ensures that the cable 1 is prevented from falling off the terminal metal fitting 5. In this regard, according to the present embodiment, the protruding tapered portion 29 and the conical portion 35 of the diameter-enlarging member 31 have complementarily inclined large areas, and thus, they may exert the anchor effect while ensuring the large contact area or frictional force in relation to the surrounding wires 3 sandwiched therebetween.

While an inclination angle of the protruding tapered portion 29 (and the conical portion of the diameter-enlarging member) is set depending on the elongation characteristic, etc. of the rope used, it is generally preferably in the range of 5 to 25 degrees with respect to the horizon. When the inclination angle is 5 degrees or less, the effect of pressure force is small, and when the inclination angle is 25 degrees or more, a corner is formed, which causes the shearing force. Thus, these angles outside the above range are not preferable. Therefore, the amount of swaging or the inclination angle of the tapered portion 21 of the large-diameter portion 19 should be considered so as to achieve the angle within the above range. Further, a contact between the protrusion surface 27 and the protruding tapered portion 29 and a contact between the protruding tapered portion 29 and the inner peripheral surface 13 may be adequately rounded as necessary.

The other protruding tapered portion 29 located on the proximal opening side prevents the cable 1 from being cut near a mouth of the terminal metal fitting 5.

As an additional description of the swaging which may be preferably used in the present embodiment, the swaging is performed using a die having a processing groove in the center, which is comprised of upper and lower halved dies. A diameter of the processing groove is substantially the same as the outer diameter of the terminal metal fitting 5 (reference diameter portion 23), and a length of the processing groove is substantially the same as the length of the terminal metal fitting 5.

The terminal metal fitting 5 is placed in the processing groove, and the halved dies are moved up and down while rotating the terminal metal fitting, such that the pressing and compression are performed. A pressure by the dies is applied to only the large-diameter portion 19, and not to the reference diameter portion 23, at least in the beginning of the compression. The large-diameter portion 19 begins the plastic deformation toward the center of the through hole 11 under the strong compression force.

The compression step is repeated a plurality of times such that the outer diameter of the large-diameter portion 19 is substantially the same as the outer diameter of the reference diameter portion 23. The multiple compression steps may be conducted using a plurality set of halved dies with respective processing grooves having respective different diameters, or using one set of halved dies having a plurality of processing grooves of different diameters.

This allows the large-diameter portion 19 to be reversed into the through hole 11 through the plastic deformation, such that the protrusion 25 is formed within the through hole whose diameter has been constant throughout its length.

On the other hand, the reference diameter portion 23 is hardly subject to the swaging. Thus, the portion of the through hole 11 closer to the distal opening 17 than the protrusion 25, i.e., the portion of the through hole 11 at a position corresponding to the reference diameter portion 23, still has the original diameter. Therefore, the protruding tapered portion 29 is formed, which sandwiches the surrounding wires 3 between the protruding tapered portion 29 and the diameter-enlarging member 31.

In the present embodiment, the large-diameter portion 19 of the terminal metal fitting 5 has the flat outer peripheral surface 20. However, the outer peripheral surface may be textured such that the reversely formed protrusion surface 27 is similarly textured, thereby increasing the frictional force against the rope. This may be applied to one or both of the tapered portion 21 of the large-diameter portion 19 (therefore, the protruding tapered portion 29 of the protrusion 25) and the conical portion 35 of the diameter-enlarging member 31, as well. However, in this case, attention needs to be paid to avoid stress concentration.

Further, while the large-diameter portion 19 is trapezoidal when viewed from the side, the inclination angles of the tapered portions 21 at both ends of the large-diameter portion (therefore, the protruding tapered portions 29) may be different from each other. Alternatively, the large-diameter portion 19 may be omitted to be replaced by the reference diameter portion 23, such that the terminal metal fitting 5 may be comprised of only the reference diameter portion throughout its length.

While it is preferable that the large-diameter portion 19 is provided and pressed to form the protrusion 25, the protrusion 25 having the protruding tapered portions 29 may also be formed within the through hole 11 by pressing a portion of the reference diameter portion. Further, the protruding tapered portion 29 may not necessarily be tapered, and a preferable shape may be appropriately selected in relation to the diameter-enlarging member 31.

In this way, according to the present invention, the axially extending protrusion having a fixed width, which is protrudingly formed within the through hole of the terminal metal fitting, constrains the rope in an encompassing manner from the outside in the circumferential direction. Thus, even if the rope is the high-strength fiber composite cable, etc., which is vulnerable to diametrical local shearing force, the rope may be firmly secured and may be prevented from falling off, without the action of the shearing load.

Since the diameter-enlarging member cooperates with the ends of the protrusion protrudingly formed within the through hole to exert the anchor effect on the rope, the rope is further firmly fastened to the terminal metal fitting. Even if the rope is a highly elastic rope such as a rubber cord which has large tensile elongation and a variable cross-sectional area, a strong slip-off prevention effect may be still exhibited.

Further, since the expansive filler such as cement is not used, precise control on an amount, temperature, etc. of the expansive filler is not necessary at a construction site. Thus, according to the present invention, a fixing tool may be easily attached to the terminal of the rope, and high fixing efficiency and fixing effect as well as instant expression of the fixing effect may be achieved, without the need for particular limitation on the operator skill. Also, the working hours may be significantly reduced, and the operating efficiency may be improved.

The present invention may be applied (implemented) in the following situations.

Prestressed concrete is known as concrete with compressive force applied.

Such prestressed concrete is a concrete product to which a compressive load is applied, as is well known.

A method for applying the compressive load to the concrete includes a method in which a through hole is provided in a concrete body in a longitudinal direction, a wire such as a rope or steel wire is inserted through the through hole and tensioned, and then, both ends of the wire are fixed to respective both ends of the concrete body using the fixing tools.

In the above method, in order to tension the carbon fiber composite cable 1 (wire) with the terminal metal fittings 5 according to the present invention, the terminal metal fittings 5 attached to the ends of the carbon fiber composite cable 1 are pulled by hydraulic jacks, etc., such that tension is applied to the carbon fiber composite cable 1.

However, since the length of the terminal metal fitting 5 protruding outwardly from the concrete body is short, only a portion of the terminal metal fitting 5 may be clamped. Further, even if the terminal metal fittings 5 are pulled by the hydraulic jacks, etc., clamping force by a clamping tool is weak, and thus, the clamping tool is easily detached from the terminal metal fitting 5. Therefore, it may be difficult to apply the tension to the carbon fiber composite cable 1.

Then, in order to surely clamp the terminal metal fitting 5 attached to the end of the carbon fiber composite cable 1, and to easily apply the tension to the carbon fiber composite cable 1 even with the use of the hydraulic jack, etc., a thread groove 230 may be formed on an inner surface of the reference diameter portion 23 of the terminal metal fitting 5 in the present invention.

By doing so, when a screw shaft S with a thread groove S10 threadably engaged with the thread groove 230 is used to couple the terminal metal fitting 5 and the screw shaft S, the length of the terminal metal fitting 5 protruding outwardly from the concrete body is increased. Therefore, the hydraulic jack, etc. may clamp the screw shaft S, not the terminal metal fitting itself, thereby increasing the clamping force.

This configuration, which allows tensioning force to be easily applied to the wire, has outstanding operating efficiency.

Described below is a tension test performed on a carbon fiber composite cable with its terminals treated according to the present invention. The rope used was a carbon fiber composite cable (CFCC), which was comprised of a seven-strand wire formed by impregnating carbon fibers with epoxy resin. The terminal metal fittings according to the present invention were attached to both ends of the cable and installed in a tension testing device. The tension test was conducted on a total of twenty cables manufactured as above. The test condition is as follows.

(1) CFCC: $\varphi$: 10.5 mm; breaking load (breaking load for the rope itself): 141 kN; effective sectional area: 57.8 $mm^2$; elongation at rupture: 1.3%

(2) Terminal metal fitting: proof load ≥70.5 kN (50% or more of the breaking load for the rope); length of reference diameter portion: 100 mm; outer diameter of reference diameter portion: 24 mm; length of large-diameter portion: 180 mm; outer diameter of large-diameter portion: 24+0.97 to 1.64 mm; total length: 280 mm; inner diameter (diameter of through hole): 11.2 mm (3) Material of terminal metal fitting: SCM415

The outer diameter of the reference diameter portion of the terminal metal fitting was set to be 24 mm as described above, the outer diameter of the large-diameter portion (outer diameter before pressing) was gradually changed within a range between 24+0.97 to 1.64 mm, and each terminal metal fitting was swaged until the outer diameter of the large-diameter portion was substantially the same as the outer diameter of the reference diameter portion. The results of the tension test are shown in Table 1.

The efficiency (%) was a value derived from the formula: breaking load under tension (kN)/breaking load for the rope itself (141 kN)×100.

TABLE 1

| No. | Outer diameter before pressing (mm) | Breaking load under tension (kN) | Efficiency (%) |
|---|---|---|---|
| 1 | 24.97 | 72.4 | 51.3 |
| 2 | 25.01 | 72.2 | 51.2 |
| 3 | 25.04 | 84.5 | 60.0 |
| 4 | 25.08 | 95.0 | 67.4 |
| 5 | 25.12 | 102.3 | 72.6 |
| 6 | 25.14 | 97.2 | 68.9 |
| 7 | 25.19 | 103.5 | 73.4 |
| 8 | 25.22 | 114.2 | 81.0 |
| 9 | 25.27 | 105.5 | 74.8 |
| 10 | 25.29 | 119.2 | 84.5 |
| 11 | 25.32 | 142.9 | 101.3 |
| 12 | 25.36 | 139.0 | 98.6 |
| 13 | 25.39 | 139.8 | 99.1 |
| 14 | 25.42 | 136.8 | 97.0 |
| 15 | 25.46 | 140.5 | 99.6 |
| 16 | 25.50 | 131.6 | 93.3 |
| 17 | 25.53 | 131.3 | 93.1 |
| 18 | 25.57 | 138.0 | 97.9 |
| 19 | 25.60 | 129.1 | 91.6 |
| 20 | 25.64 | 128.0 | 90.8 |

As is clear from Table 1, regarding the outer diameter before pressing in Nos. 11-20, it was confirmed that an efficiency of 90% or more could be ensured. As for the guaranteed efficiency for the swaging, 90% or more is considered sufficient. In Nos. 1-3, when the rope was tensioned, the rope did not break, but was pulled out of the terminal metal fitting. In Nos. 19 and 20, the efficiency began to deteriorate, and thus, these Nos. seemed to be the limit.

Another test was further conducted in order to determine an optimum length of the terminal metal fitting. As with the above test, the rope used was a carbon fiber composite cable (CFCC), which was comprised of a seven-strand wire formed by impregnating carbon fibers with epoxy resin. The terminal metal fittings according to the present invention were attached to both ends of the CFCC and installed in a tension testing device. The tension test was conducted on a total of ten cables manufactured as above. The test condition was as follows.

(1) CFCC: $\varphi$: 10.5 mm; breaking load (breaking load for the rope itself): 141 kN; effective sectional area: 57.8 $mm^2$; elongation at rupture: 1.3%

(2) Terminal metal fitting: length of reference diameter portion: 60 mm; outer diameter of reference diameter portion: 24 mm; length of large-diameter portion (mm): d (rope diameter)×6 to 15; outer diameter of large-diameter portion: 25 mm; total length (mm): 60+d×6 to 15; inner diameter (diameter of through hole): 11.2 mm (3) Material of terminal metal fitting: SCM415

The length of the large-diameter portion of the terminal metal fitting in an axial direction was gradually changed within a range of d (rope diameter)×6 to 15 (in millimeters), the outer diameter of the large-diameter portion was constant, and each terminal metal fitting was swaged until the outer diameter of the large-diameter portion was substantially the same as the outer diameter of the reference diameter portion. The results of the tension test are shown in Table 2.

The efficiency (%) was derived from the formula: breaking load under tension (kN)/breaking load for the rope itself (141 kN)×100.

TABLE 2

| No. | Length of large-diameter portion (mm) | Breaking load under tension (kN) | Efficiency (%) |
|---|---|---|---|
| 1 | d × 6 | 70.2 | 49.8 |
| 2 | d × 7 | 73.2 | 51.9 |
| 3 | d × 8 | 103.7 | 73.5 |
| 4 | d × 9 | 118.0 | 83.7 |
| 5 | d × 10 | 136.3 | 96.7 |
| 6 | d × 11 | 128.0 | 90.8 |
| 7 | d × 12 | 128.7 | 91.3 |
| 8 | d × 13 | 138.6 | 98.3 |
| 9 | d × 14 | 138.3 | 98.1 |
| 10 | d × 15 | 133.6 | 94.8 |

As is clear from Table 2, the efficiency exceeded 80% when the length of the terminal metal fitting (length of the large-diameter portion) was the rope diameter×10. In Nos. 5 to 10, the efficiency was greater than 90%. The length of the terminal metal fitting may not be unnecessarily lengthened. However, based on the test results, the length equal to the rope diameter×13 will be desirable in view of safety, workability, weight saving, etc.

While the preferred embodiments of the present invention have been shown and described, these embodiments are merely illustrative, and should not be construed as limiting the scope of the present invention. While many variations and modifications based on the description herein are possible without departing from the spirit and scope of the present invention, it should be understood that these variations and modifications are included in the scope of protection of the present invention.

REFERENCE NUMERALS

1: rope
2: core wire
3: surrounding wire
5: terminal metal fitting
7: proximal end
9: distal end
11: through hole
13: inner peripheral surface
15: proximal opening
17: distal opening
19: large-diameter portion
20: outer peripheral surface
21: tapered portion
23: reference diameter portion
25: protrusion
27: protrusion surface
29: protruding tapered portion
31: diameter-enlarging member
33: bottom
35: conical portion
37: through hole

What is claimed is:

1. A rope terminal fixing method comprising the steps of:
  preparing a tubular terminal metal fitting having:
    a proximal opening formed at a proximal end thereof, the proximal end defining a large-diameter portion,
    a distal opening formed at a distal end thereof, the distal end defining a reference diameter portion smaller than the large-diameter portion, and
    a through hole communicating the proximal opening and the distal opening;
  inserting a terminal of a rope through the proximal opening into the through hole;
  extending a portion of the terminal of the rope out of the distal opening;
  enlarging a diameter of the terminal of the rope by fixing a diameter-enlarging member to a strand or wire of the rope;
  bringing the terminal of the rope back into the through hole; and
  pressing the large-diameter portion inwardly to make a diameter of the through hole smaller than the maximum diameter of the diameter-enlarged terminal of the rope, such that the large-diameter portion has substantially the same diameter as the reference diameter portion, and a protrusion is formed on an inner surface of the through hole, the protrusion pushing against an outer peripheral surface of the rope to constrain the rope within the through hole.

2. The rope terminal fixing method according to claim 1, wherein a thickness of the large-diameter portion is determined such that sufficient constraining force may be achieved without breaking surrounding wires or strands constituting the rope.

3. The rope terminal fixing method according to claim 1, wherein a tapered surface is formed on the distal opening side in the through hole between an inner surface having a small diameter due to the formation of the protrusion and an inner surface at the end on the distal opening side where the diameter is large due to a lack of the protrusion.

4. The rope terminal fixing method according to claim 1, wherein the rope is formed by twisting a plurality of lateral strands together around a central strand.

5. The rope terminal fixing method according to claim 1, wherein the rope is a high-strength fiber composite cable comprising a carbon fiber composite cable formed by twisting a plurality of surrounding wires together around a core wire.

6. A rope with terminal fixing tools, wherein the rope comprises the terminal fixing tools attached thereto by the rope terminal fixing method according to claim 1.

7. A tubular terminal metal fitting used for fixing a terminal of a rope, the tubular terminal metal fitting comprising:
  a distal end and a proximal end, with a through hole extending therebetween;
  a reference diameter portion at the distal end, and comprising a distal opening;
  a large-diameter portion at the proximal end, having a thickness greater than the reference diameter portion, and comprising a proximal opening; and
  a rope having a diameter-enlarging member fixed to a terminal thereof;
  wherein when the large-diameter portion is pressed inwardly while the rope terminal is positioned inside of the reference diameter portion, the diameter of the through hole within the large-diameter portion is made smaller than the maximum diameter of the terminal of the rope, such that the large-diameter portion has substantially the same diameter as the reference diameter portion, and a protrusion is formed on an inner surface of the through hole, which pushes against an outer peripheral surface of the rope and constrains the rope within the through hole.

* * * * *